United States Patent
Wang

(10) Patent No.: US 6,953,326 B2
(45) Date of Patent: Oct. 11, 2005

(54) AIR PUMP HAVING AIR CYLINDER/ MANUAL DUAL CHARGING MODE

(76) Inventor: Lo-Pin Wang, 16F-2, No. 17, Lane 52, Sec. 3, Re He Rd., Taichung (TW)

( * ) Notice: Subject to any disclaimer, the term of this patent is extended or adjusted under 35 U.S.C. 154(b) by 340 days.

(21) Appl. No.: 10/422,990

(22) Filed: Apr. 25, 2003

(65) Prior Publication Data

US 2003/0221724 A1 Dec. 4, 2003

(30) Foreign Application Priority Data

Jun. 3, 2002 (TW) ........................ 91208148 U

(51) Int. Cl.$^7$ .......................... F04B 53/00; B65B 31/00
(52) U.S. Cl. ...................... 417/234; 417/432; 417/440; 417/469; 141/38; 141/386
(58) Field of Search ............................... 417/234, 432, 417/440, 469, 572, 3, 5; 222/399, 401; 141/38, 383, 386

(56) References Cited

U.S. PATENT DOCUMENTS 6,164,938 A * 12/2000 Chuang ...................... 417/569
6,202,714 B1 * 3/2001 Wang ......................... 141/329
6,267,161 B1 * 7/2001 Barbieri ...................... 141/383
6,883,565 B2 * 4/2005 Marui ........................ 141/231

* cited by examiner

Primary Examiner—Charles G. Freay
(74) Attorney, Agent, or Firm—Bacon & Thomas PLLC

(57) ABSTRACT

An air pump includes a connector connecting to an air nozzle of an object to be inflated, a holder block connected to the connector and having a valve chamber, an air cylinder air inlet and a manual charge air inlet extended from the vale chamber to the rear side thereof, and an air passage extended from the valve chamber to the inside of the connector, a press button mounted in the holder block and movable between a first position and a second position, a fixed cylinder connected to the holder block and holding an air cylinder, and a movable cylinder sleeved onto the fixed cylinder for reciprocating to pump air into the fixed air cylinder.

13 Claims, 4 Drawing Sheets

AIR PUMP HAVING AIR CYLINDER/MANUAL DUAL CHARGING MODE

BACKGROUND OF THE INVENTION

1. Field of the Invention

The present invention relates generally to air pumps and, more particularly, to an air pump, which provides dual charging modes, an air cylinder mode and a manual mode, to be optionally operated.

2. Description of the Related Art

Regular commercially available handy bicycle air pumps are commonly operated by hand. When in use, the user must repeatedly push and pull the piston so that external air can be sucked in and driven into the tire. These air pumps are simple. However, it requires much effort to reciprocate the piston. There are air-cylinder-actuated air pumps available on the market. When an air-cylinder-actuated air pump is used to pump the tire of a bicycle, the user directly attaches an air cylinder to the air inlet of the air-cylinder-actuated air pump, enabling compressed gas (carbon dioxide) to be discharged out of the attached air cylinder into the tire. The use of an air-cylinder-actuated air pump requires less effort.

According to conventional designs, most handy air pumps provide only one single operation mode, i.e., manual operation mode or air-cylinder-actuated operation mode. Although some air pumps with air-cylinder/manual dual charging mode have been disclosed, they are still not satisfactory in function. A conventional air cylinder loadable air pump directly discharges a compressed gas into the tire upon connecting the air nozzle connector of the air pump to the air nozzle of the tire after loading an air cylinder. This design of air pump is still not satisfactory in function because while the air cylinder is empty, the air pump can be operated only by hand before loading a new air cylinder instead of the empty one.

SUMMARY OF THE INVENTION

The present invention has been accomplished under the circumstances in view. It is the primary objective of the present invention to provide an air pump having air cylinder/manual dual charging mode, which enables the user to operate the air pump optionally by an air cylinder or manually.

To achieve the foregoing objective of the present invention, the air pump comprises a connector to be connected with an air nozzle of an object to be inflated; a holder block, the holder block having a front side connected to the connector, a valve chamber, an air cylinder air inlet and a manual charge air inlet respectively extended from a rear side thereof to the valve chamber, and an air passage extended from the valve chamber to the front side of the holder block for guiding the air out of the valve chamber into the air nozzle of the object to which the connector is connected; a press button mounted in the valve chamber and movable between a first position and a second position, the press button having a part extending out of the holder block for operation by the user, at least one air seal means adapted to seal the gap between the valve chamber and the press button, the at least one air seal means of the press button separating the air cylinder air inlet and the air passage of the holder block and letting the manual charge air inlet be in communication with the air passage of the holder block when the press button moved to the first position, the air cylinder air inlet being in communication with the valve chamber and the air passage of the holder block when the press button moved to the second position; a spring member mounted inside the holder block to support the press button in the first position; a fixed cylinder, the fixed cylinder having a front side connected to the rear side of the holder block, an inside space disposed in communication with the air cylinder air inlet and the manual charge air inlet and holding an air cylinder keeping a compressed gas, the air cylinder having an opening in communication with the air cylinder air inlet, and an air inlet in a rear side thereof, and a movable cylinder sleeved onto the fixed cylinder and axially movable relative to the fixed cylinder and adapted to let outside air pass through the air inlet into the inside of the fixed cylinder when reciprocated on the fixed cylinder.

DETAILED DESCRIPTION OF THE INVENTION

Figure 1:
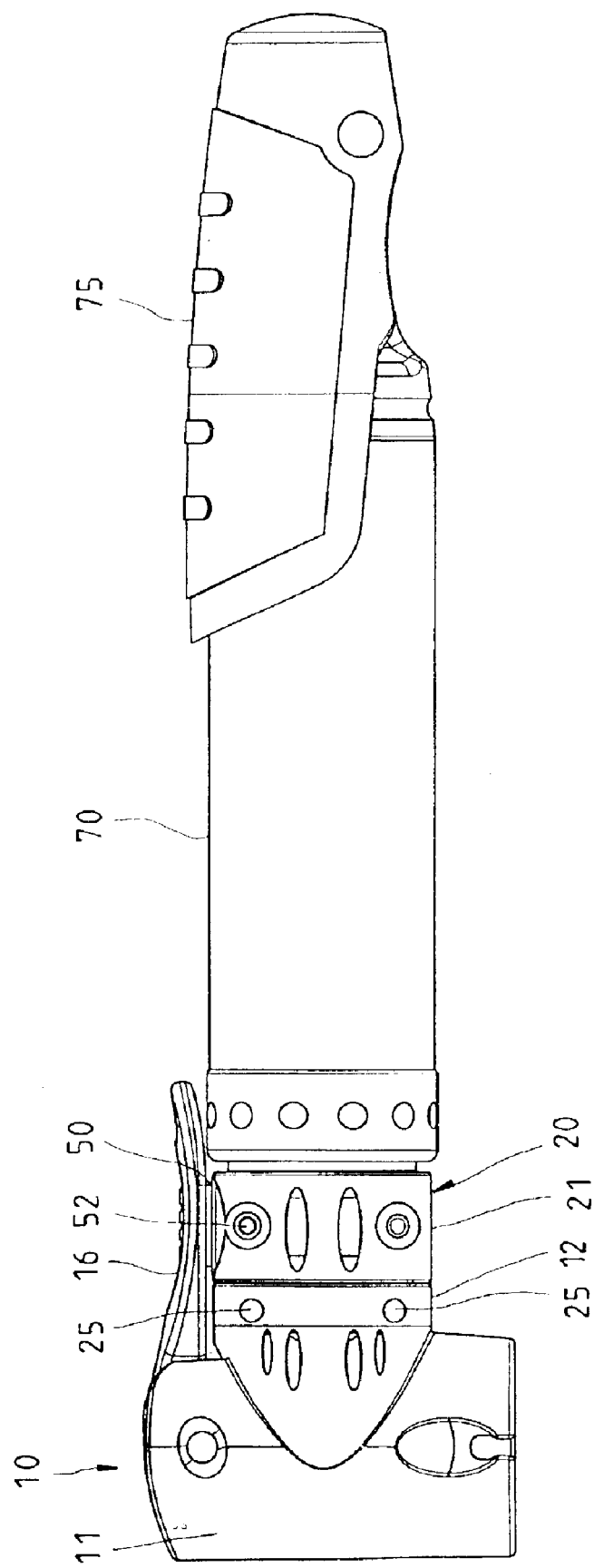
FIG. 1 is a side view of a preferred embodiment of the present invention.
Figure 2:
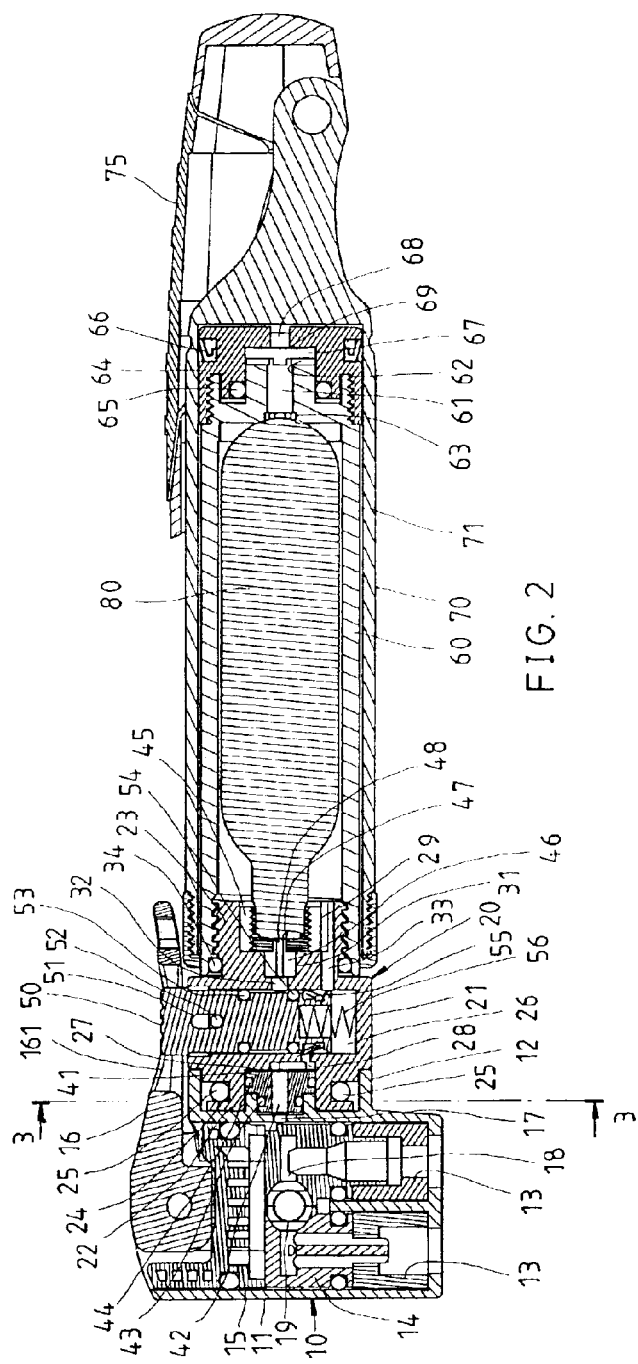
FIG. 2 is a longitudinally sectional view of the preferred embodiment of the present invention.

Referring to FIGS. 1 and 2, an air pump in accordance with an preferred embodiment of the present invention is composed of an air nozzle connector 10, a holder block 20, a stopper 41, a press button 50, a spring member 56, a lock nut 45, a needle 46, a fixed cylinder 60, a movable cylinder 70, a tailpiece 64, and a handle 75.

The air nozzle connector 10 is adapted to accommodate an air nozzle of a to-be-inflated object (for example, the tire of a bicycle) in an airtight manner, for enabling the object to be filled with the air from outside. The structure and action of the air nozzle connector 10 are not the main features of the present invention. The air nozzle connector 10 includes a cylindrical casing 11, a coupling neck 12 protruded from a lateral side of the cylindrical casing 11, the coupling neck 12 defining an air hole 17 disposed in communication with the inside space of the cylindrical casing 11, two tubular elastomeric members 13 arranged at a bottom side inside the cylindrical casing 11, a shunt 14 mounted inside the cylindrical casing 11 and supported on the tubular elastomeric members 13, the shunt 14 defining a forked flow passage 18 in communication between the air hole 17 and the inside spaces of the tubular elastomeric receptacles 13, a valve ball 19 mounted inside the forked flow passage 18 and adapted to close/open the tubular elastomeric receptacles 13, a pressure member 15 mounted inside the cylindrical casing 11 and pressed on the flow guide 14, and a lever 16 pivotally mounted to a top side of the cylindrical casing 11. When in use, the user can optionally attach a tubular elastomeric receptacle 13 to the air nozzle of the object, and then lift the lever 16 to press the pressure member 15 against the tubular elastomeric receptacles 13, thereby causing the installed tubular elastomeric receptacle 13 to be compressed and firmly secured to the air nozzle of the object to be inflated. When the air pump is operated, a compressed flow of air passes through the air hole 17 into the forked flow passage 18. At this time, the compressed flow of air pushes the valve ball 19 sideways to stop the air passage of the vacant tubular elastomeric receptacle 13, and therefore the compressed flow of air passes through the installed tubular elastomeric receptacle 13 into the inside of the object to be inflated. An air nozzle connector for a specific air nozzle, and rotary knob-controlled air nozzle connector without the lever, or any of a variety of conventional air nozzle connectors may be used instead of the aforesaid air nozzle connector 10.

Figure 3:
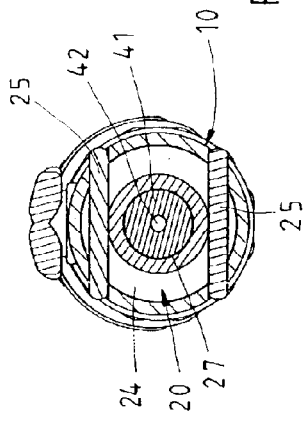
FIG. 3 is a sectional view taken along a line 3—3 indicated in FIG. 2.

The holder block 20 is connected to the coupling neck 12 of the air nozzle connector 10, including a hollow cylindrical main body 21 fitting the shape of the coupling neck 12, a coupling portion 22 axially extended from a front side of the hollow cylindrical main body 21, and a rear mounting portion 23 axially extended from a rear side of the hollow cylindrical main body 21. The coupling portion 22 and the rear mounting portion 23 each have an outer diameter relatively smaller than the cylindrical main body 21. The coupling portion 22 is inserted into the coupling neck 12 of the air nozzle connector 10, having an endless locating groove 24 extended around a periphery thereof. Two pins 25 are respectively fastened to the coupling neck 12 of the air nozzle connector 10 and bilaterally peripherally engage the endless locating groove 24 to secure the coupling portion 22 to the coupling neck 12 (see FIG. 3), enabling the coupling portion 22 to be rotated with the holder block 20 relative to the coupling neck 12 of the air nozzle connector 10. The holder block 20 further includes a valve chamber 26 radially extended in the periphery of the cylindrical main body 21, a first receiving hole 27 axially extended from the outer side of the coupling portion 22 toward the inside of the coupling portion 22, an air passage 28 in communication between the valve chamber 26 and the first receiving hole 27, a second receiving hole 29 axially extended from the outer side of the rear mounting portion 23 toward the inside of the rear mounting portion 23, a third receiving hole 31 backwardly extended from the inner end of the second receiving hole 29, an air cylinder air inlet 32 extended from the third receiving hole 31 to the valve chamber 26, and a manual charge air inlet 33 extended from the outer side of the rear mounting portion 23 near the periphery to the valve chamber 26. The rear mounting portion 23 is peripherally threaded (not indicated by a reference sign), and peripherally mounted with a seal ring 34.

The stopper 41 is provided between the air nozzle connector 10 and the holder block 20 and fastened to the first receiving hole 27 of the holder block 20, having a through hole 42 axially extended through the front and rear sides and respectively connected to the air hole 17 of the air nozzle connector 10 and the air passage 28 of the holder block 20. Two seal rings 43 and 44 are mounted on the periphery of the stopper 41 and peripherally secured to the air nozzle connector 10 and the holder block 20 to prohibit leakage of the air out of the air nozzle connector 10 and the holder block 20.

Figure 5:
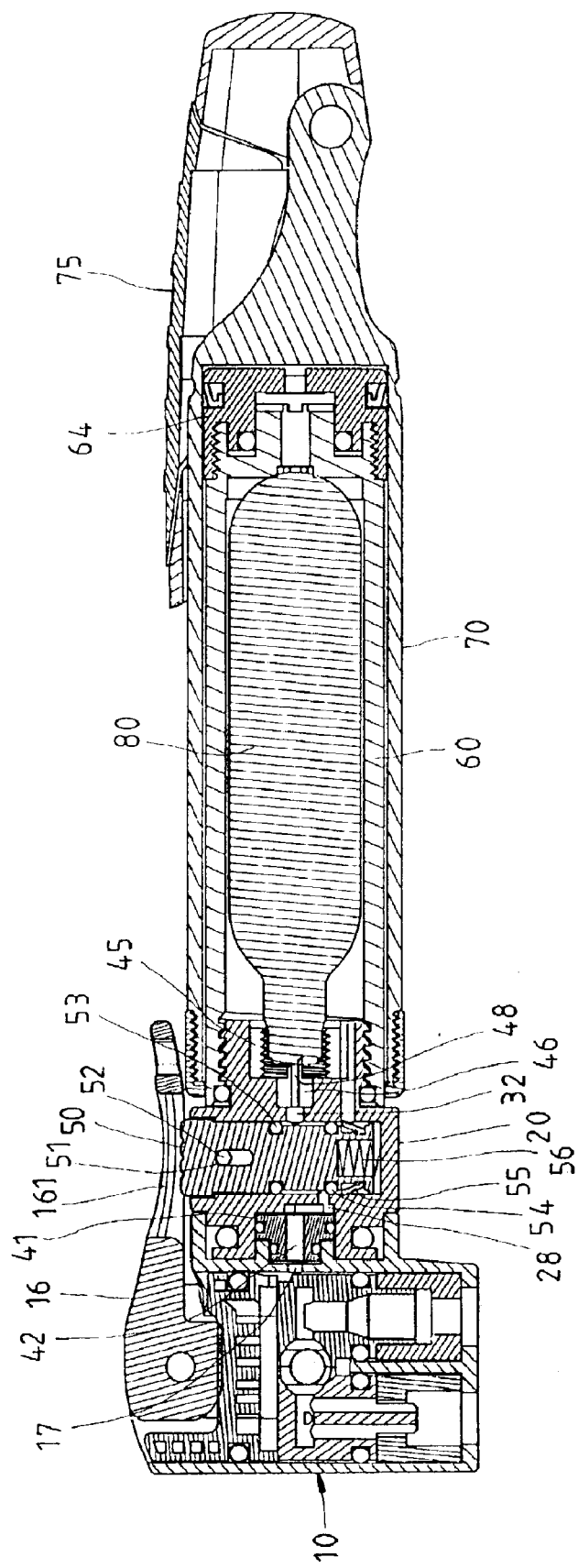
FIG. 5 is similar to FIG. 2, showing the air pump of the preferred embodiment of the present invention is operated at the air cylinder charging mode.

The press button 50 is mounted in the valve chamber 26 of the holder block 20, including an elongated slot 51 through which a pin 52 is inserted and fastened to the holder block 20 to secure the press button 50 to the holder block 20, enabling the press button 50 to be moved radially relative to the holder block 20 within a limited range between a first position near the outer side of the valve chamber 26 (see FIG. 2) and a second position near the inner side of the valve chamber 26 (see FIG. 5). The outer side of the press button 50 extends out of the valve chamber 26 to the outside of the holder block 20 for operation by the user. Further, the lever 16 of the air nozzle connector 10 has a notch 161. When the holder block 20 is rotated relative to the air nozzle connector 10 at a predetermined angle after the lever 16 has been lain on the holder block 20 (see FIG. 2), the notch 161 accommodate a protruded part of the press button 50. Two sealing members embodied as seal rings 53 and 54 are mounted on the press button 50 at different elevations and peripherally disposed in contact with the peripheral wall of the valve chamber 26. The inner end of the press button 50 is fixedly mounted with a conical one-way valve element 55. The one-way valve element 55 has an outer diameter gradually reduced from a top side thereof toward a bottom side thereof. The broad upper side of the one-way valve element 55 is flexible and disposed in contact with the peripheral wall of the valve chamber 26 to let the air pass upwards and to prohibit reverse flow of the air (the structure of the one-way valve element 55 is of the known art). When the press button 50 is moved to the first position as shown in FIG. 2, the air cylinder air inlet 32 is disposed between the two sealing members 53 and 54, at this time the manual charge air inlet 33 and the air passage 28 are disposed below the sealing members 53 and 54. When the press button is moved to the second position as shown in FIG. 5, the sealing member 53 is disposed above the air cylinder air inlet 32, i.e. the air cylinder air inlet 32 is disposed between the sealing members 53 and 54, and the sealing member 54 is disposed below the air passage 28, i.e. the air passage 28 is disposed between the sealing members 53 and 54.

The spring member 56 is a spiral spring mounted at an inner side of the valve chamber 26 of the holder block 20, and stopped between the holder block 20 and the press button 50. Normally, the spring member 56 supports the press button 50 in the aforesaid first position.

The lock nut 45 is mounted in the second receiving hole 29 of the holder block 20 in axial direction, having an inner thread (not indicated by a reference sign).

The needle 46 is mounted in the third receiving hole 31 of the holder block 20, having a pointed tip 47 suspended inside of the lock nut 45 and an axial through hole 48 axially extended through the pointed tip 47 in communication with the air cylinder air inlet 32 of the holder block 20.

The fixed cylinder 60 has a front end detachably fastened to the rear mounting portion 23 of the holder block 20 by a screw joint. The seal ring 34 seals the gap between the fixed cylinder 60 and the rear mounting portion 23 of the holder block 20. The rear end of the fixed cylinder 60 has an air inlet 61 and radial ribs 62 and 63 around the air inlet 61.

Figure 4:
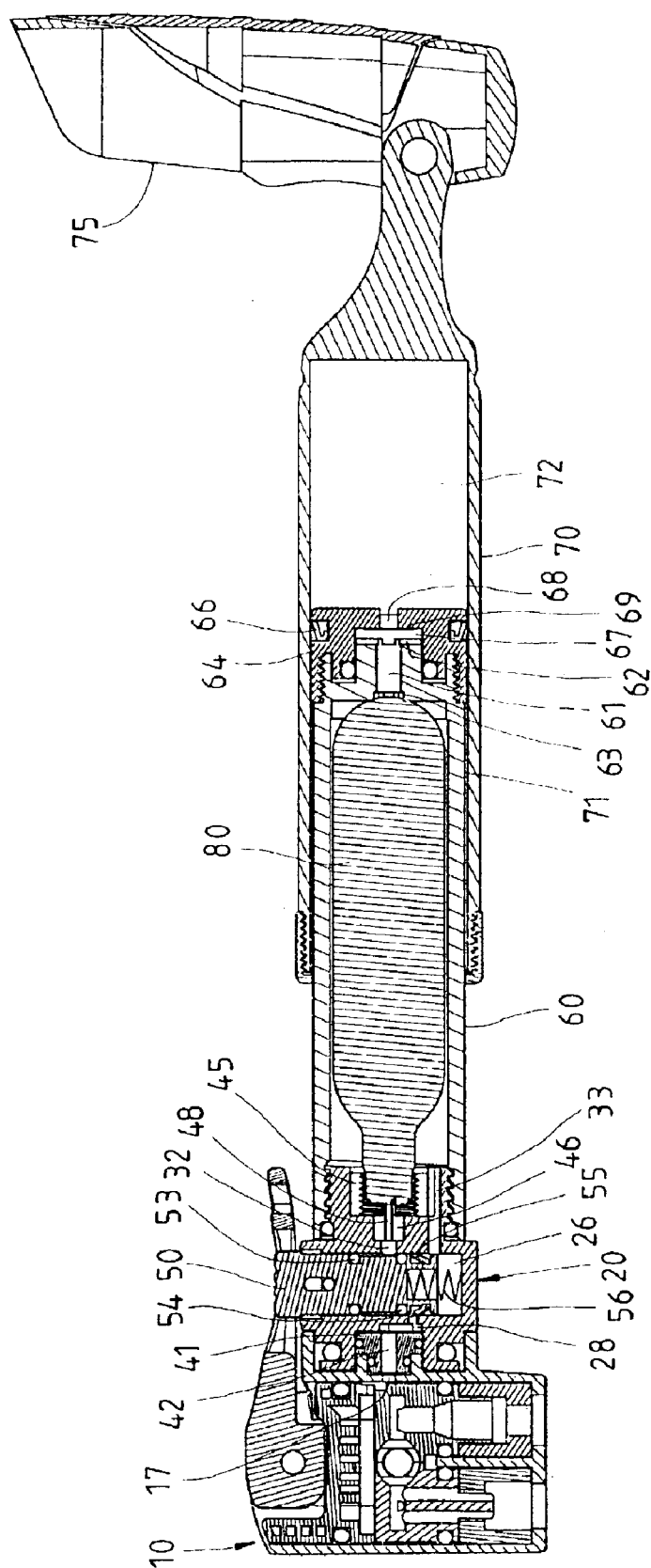
FIG. 4 is similar to FIG. 2, showing that an air pump of the preferred embodiment of the present invention is operated at the manual charging mode.

The movable cylinder 70 is sleeved onto the fixed cylinder 60, axially movable relative to the fixed cylinder 60 (see FIGS. 2 and 4), and rotatable relative to the fixed cylinder 60.

The tailpiece 64 is threaded onto the rear end of the fixed cylinder 60. A seal ring 65 is mounted in between the tailpiece 64 and the fixed cylinder 60 to prohibit an air leakage. A one-way valve element 66 is mounted on the periphery of the tailpiece 64. The shape of the one-way valve element 66 is similar to the aforesaid one-way valve element 55. The one-way valve element 66 has a flexible broad rear side disposed in contact with an inside wall of the movable cylinder 70 to let the air pass from a front side thereof toward the rear side thereof. The center area of the front side of the tailpiece 64 and the center area of the rear side of the fixed cylinder 60 define a chamber 67. The tailpiece 64 has a through hole 68 extended through the rear side in communication with the chamber 67. A valve flap 69 is mounted in the chamber 67, together with the chamber 67, to form a one-way air valve that enables air to pass from the through hole 68 into the air inlet 61 of the fixed cylinder 60 (this will be described further).

The handle 75 is a hollow cylindrical member obliquely partially cut and pivoted to the rear side of the movable cylinder 70. The handle 75 is turnable between the position shown in FIGS. 1 and 2 where the handle 75 is axially extended in parallel to the cylinders 60 and 70, and the position shown in FIG. 4 where the handle 75 is disposed perpendicular to the cylinders 60 and 70 for operation by the user.

Before use, the user can disconnect the fixed cylinder 60 from the holder block 20 (slightly pull the movable cylinder 70 outwards for enabling the fixed cylinder 60 to be rotated and disconnected from the holder block 20), and then insert an air cylinder 80 into the inside of the fixed cylinder 60, and then connect the fixed cylinder 60 to the holder block 20 again. If the selected air cylinder 80 has an outer thread, the outer thread of the air cylinder 80 is threaded into the lock nut 45 in the rear side of the holder block 20. If the selected air cylinder 80 has a small nozzle without outer thread, the loaded air cylinder 80 will be forced forwards by the fixed cylinder 60 when fastening the fixed cylinder 60 to the holder block 20. Anyway, the pointed tip 47 of the needle 46 will be forced into the loaded air cylinder 80, for enabling compressed gas to pass out of the loaded air cylinder 80 into the axial through hole 48 of the needle 46. Further, the rear end of the air cylinder 80 has a semispherical shape. When the rear end of the air cylinder 80 touches the inside wall of the rear end of the fixed cylinder 60, the radial ribs 62 and 63 prevent the rear end of the air cylinder 80 from blocking the air inlet 61.

Normally, as shown in FIG. 2, the spring member 56 supports the press button 50 in the first position. At this time, the air cylinder air inlet 32 is disposed between the seal members 53 and 54 at the press button 50, and the air passage 28 is disposed below the seal members 53 and 54, i.e., the lower seal member 54 seals the gap between the air cylinder air inlet 32 and the air passage 28. Therefore, when compressed gas passes through the air cylinder air inlet 32 into the valve chamber 26, it is stopped between the seal members 53 and 54 and prohibited from passing to the air passage 28.

The air pump optionally provides an air cylinder charging mode and a manual charging mode for operation. When the manual charging mode is selected, attach the air nozzle connector 10 to the air nozzle of the object to be inflated (not shown), and then lift the lever 16 to secure the air nozzle connector 10 to the air nozzle, and then hold the air nozzle connector 10 and the holder block 20 with one hand and operate the (lifted) handle 75 with the other hand to reciprocate the movable cylinder 70. Upon each back stroke of the movable cylinder 70, outside air passes from the front open end of the movable cylinder 70 into the tubular gap 71 between the cylinders 60 and 70 and then through the one-way valve element 66 in the rear side of the fixed cylinder 60 into the gradually expanded air chamber 72 between the cylinders 70 and 60 (see FIG. 4). Upon each forward stroke of the movable cylinder 70, the air chamber 72 is gradually reduced to compress the inside air, which is stopped from reverse flow by the one-way valve element 66 and forced through the through hole 68 of the tailpiece 64 into the chamber 67 to press the valve flap 69 on the rear side of the fixed cylinder 60. Because the valve flat 69 is pressed on the radial ribs 62 at this time, compressed air passes through gaps in between the radial ribs 62 into the air inlet 61 and then the inside space of the fixed cylinder 60.

Because the space between the outside wall of the air cylinder 80 and the inside wall of the fixed cylinder 60 is not in an airtight status, compressed air is allowed to pass to the front side of the fixed cylinder 60 directly, and then to pass from the front side of the fixed cylinder 60 through the manual charge air inlet 33 of the holder block 20 into the valve chamber 26, and then to pass from the valve chamber 26 through the one-way valve element 55 of the press button 50, the air passage 28, the through hole 42 of the stopper 41 and the through hole 17 of the air nozzle connector 10 into the inside of the object to be inflated. Therefore, repeatedly reciprocating the movable cylinder 70 pumps outside air into the inside of the object.

When stopping the pumping action, there are three "one-way valve means" to prohibit reverse flow of air, i.e., the one-way valve element 55 at the press button 50, the valve flat 69 at the rear side of the fixed cylinder 60, and the one-way valve element 66 at the rear side of the fixed cylinder 60. When the valve flap 69 pushed backwards by air passing from the fixed cylinder 60, it will be closely attached to the tailpiece 64 to stop the through hole 68 of the tailpiece 64. It is not requisite to have all these three "one-way valve means", however it is necessary to have means to stop reverse flow.

When selecting the air cylinder charging mode to inflate the object with the air cylinder 80, attach the air nozzle connector 10 to the air nozzle of the object to be inflated, and the press the press button 50. As illustrated in FIG. 5, when the user pressed the press button 50 and holding the press button 50 in the second position, the air cylinder air inlet 32 of the holder block 20 is disposed between the seal members 53 and 54 of the press button 50, for enabling compressed gas to pass in proper order from the air cylinder 80 through the air cylinder air inlet 32, the valve chamber 26, the air passage 28, the through hole 42 of the stopper 41 and the through hole 17 of the air nozzle connector 10 into the inside of the object to be inflated. When the user released the press button 50, the spring member 56 immediately returns the press button 50 to the first position, and therefore the air passage from the air cylinder 80 is blocked.

As indicated above, the present invention provides an air pump, which enables the user to select between the manual charge mode and the air cylinder charge mode conveniently. When inflating a bicycle tire that is completely flattened (after a repair work), the user can directly charge the bicycle tire with the compressed air of the air cylinder to the saturated status. If the air cylinder is empty before inflating the bicycle tire to the saturated status, the user can switch the air pump to the manual charge mode to pump outside air into the bicycle tire by hand. Alternatively, the user can operate the air pump to pump outside air into the object to be inflated by hand, or operate the air pump to pump outside air into the object to be inflated by hand at the first stage and then switch the air pump to the air cylinder discharge mode for enabling compressed gas to be discharged out of the air cylinder into the object when the hand tired.

According to the aforesaid embodiment, the holder block 20 is rotatable relative to the air nozzle connector 10 so that the user can adjust the angular position of the holder block 20 to be in alignment with the press button 50 at the front side of the user after connection of the air nozzle connector 10 to the air nozzle of the object to be inflated.

What is claimed is:

1. An air pump comprising;

a connector to be connected with an air nozzle of an object to be inflated;

a holder block having a front end connected to said connector, a valve chamber, an air cylinder air inlet and a manual charge air inlet respectively running through said valve chamber from a rear side thereof, and an air passage running through said valve chamber to the front side of said holder block for communicating with said connector;

a press button mounted in said valve chamber and movable between a first position and a second position, said press button having a part exposed out of said holder block for being pushed, at least one air seal means adapted to seal a gap between said valve chamber and said press button and to separate said air cylinder air inlet and said air passage of said holder block for said manual charge air inlet be in communication with the air passage of said holder block while said press button is moved to said first position, said air cylinder air inlet being in communication with said valve chamber and the air passage of said holder block while said press button is moved to said second position;

a spring member mounted inside said holder block to support said press button in said first position;

a fixed cylinder having a front side connected to the rear side of said holder block, an inside space in communication with said air cylinder air inlet and said manual charge air inlet and holding an air cylinder, said air cylinder holding a compressed gas and having an output nozzle in communication with said air cylinder air inlet, and an air inlet at a rear side thereof; and a movable cylinder sleeved onto said fixed cylinder and axially movable relative to said fixed cylinder and adapted to let outside air pass through said air inlet into the inside of said fixed cylinder while being reciprocated on said fixed cylinder.

2. The air pump as defined in claim 1, wherein said holder block is relatively rotatably connected to said air nozzle connector.

3. The air pump as defined in claim 2, wherein said air nozzle connector comprises a hollow cylindrical coupling neck; said holder block comprises an endless groove extended around a periphery thereof and a cylindrical coupling portion at a front end thereof for plugging into said coupling neck of said air nozzle connector, two pins peripherally engaging said endless groove at two sides and respectively fastened to said coupling neck of said air nozzle connector to secure said holder block to said air nozzle connector, enabling said holder block to be rotated relative to the coupling neck of said air nozzle connector.

4. The air pump as defined in claim 3, wherein said holder block comprises a receiving hole axially extended from an outer side of the coupling portion thereof toward the inside of said coupling portion and accommodating a stopper, said stopper having a through hole axially extended through front and rear sides thereof in the air communication between said air nozzle connector and the air passage of said holder block, said stopper having two seal rings mounted on the periphery thereof and peripherally secured to said air nozzle connector and said holder block to prevent the air from leaking out of said air nozzle connector and said holder block.

5. The air pump as defined in claim 1, wherein the valve chamber of said holder block has an opening running through the surface of said holder block; the distance between said air cylinder air inlet and said opening of said valve chamber is shorter than the distance between the air passage of said holder block and said opening of said valve chamber; the distance between said manual charge air inlet and the opening of said valve chamber being greater than the distance between said air passage of said holder block and the opening of said valve chamber; said spring member is mounted in an inner side of said valve chamber and stopped between said holder block and said press button; the distance between said first position and the opening of said valve chamber is less than the distance between said second position and the opening of said valve chamber; said at least one air seal means of said press button includes two air seal rings; said air cylinder air inlet is disposed between said two air seal rings of said press button, and said manual charge air inlet and said air passage of said holder block are disposed at an outer side relative to the two air seal rings of said press button when said press button is moved to said first position; said air cylinder air inlet and the air passage of said holder block are disposed between said two air seal rings of said press button when said press button is moved to said second position.

6. The air pump as defined in claim 5, wherein said air nozzle connector has a lever pivoted thereto, said lever having a notch, said notch receiving a part of said press button that protrudes outside said holder block when said lever lies on said nozzle connector.

7. The air pump as defined in claim 1 or 5, wherein said press button is fitted with a one-way valve element peripherally contacting against a peripheral wall of said valve chamber such that said one-way valve element is disposed between said manual charge air inlet and the air passage of said holder block for enabling the air to pass through said manual charge air inlet into the air passage of said holder block and for prohibiting reverse flow of the air from the air passage of said holder block into said manual charge air inlet when said press button is moved to said first position.

8. The air pump as defined in claim 1, wherein said holder block comprises a lock nut axially disposed in the rear side and aligned with said fixed cylinder and adapted to receive the output nozzle of said air cylinder, said lock nut having an inner thread for threading onto the output nozzle of said air cylinder, a needle axially suspended in said lock nut, said needle having a pointed tip for inserting into the output nozzle of said air cylinder and an axial through hole adapted to guide compressed air from said air cylinder into said air cylinder air inlet.

9. The air pump as defined in claim 1, wherein said press button has an elongated slot and a pin inserted through said elongated slot and fastened to said holder block.

10. The air pump as defined in claim 1, wherein said fixed cylinder is detachably fastened to said holder block by a screw joint.

11. The air pump as defined in claim 1, wherein said air inlet of said fixed cylinder extends from an outer side of said fixed cylinder into an inner side of said fixed cylinder and protected by radial ribs at said inner side of said fixed cylinder.

12. The air pump as defined in claim 1, wherein said fixed cylinder has a one-way seal ring mounted on the rear side thereof and peripherally disposed in contact with an inside wall of said movable cylinder to let the air pass from the front side thereof toward the rear side thereof and to prohibit reverse flow of the air from the rear side thereof toward the front side thereof.

13. The air pump as defined in claim 1, wherein said air inlet of said fixed cylinder is mounted with a one-way air valve that allows the air to pass from the rear side thereof into the inside of said fixed cylinder and prohibits reverse flow of the air through said air inlet of said fixed cylinder.

* * * * *